(12) United States Patent
Morrow et al.

(10) Patent No.: US 7,361,835 B2
(45) Date of Patent: *Apr. 22, 2008

(54) TONEABLE CONDUIT AND METHOD OF PREPARING SAME

(75) Inventors: Jason Norman Morrow, Taylorsville, NC (US); Robert Miller Ward, Jr., Hickory, NC (US); Zeb Leonard Kale, Hiddenite, NC (US); Michael Ray Bailey, Statesville, NC (US)

(73) Assignee: Commscope, Inc. of North America, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/989,289

(22) Filed: Nov. 20, 2001

(65) Prior Publication Data

US 2003/0094297 A1    May 22, 2003

(51) Int. Cl.
*H02G 3/04* (2006.01)
(52) U.S. Cl. .................. 174/68.1; 174/98; 174/481; 174/72 R; 138/104
(58) Field of Classification Search .......... 174/48, 174/98, 68.3, 97, 72 R, 112, 480, 68.1, 104, 174/110, 37, 650, 135, 95, 96, 21 R, 21 C, 174/101; 138/104, 110, 132, 140; 248/68.1; 52/287.1; 324/326, 66, 67
See application file for complete search history.

(56) References Cited

U.S. PATENT DOCUMENTS 2,722,237 A    11/1955 Rosel 3,086,557 A    4/1963   Peterson
3,367,370 A *  2/1968   Sherlock ............... 138/104

(Continued)

FOREIGN PATENT DOCUMENTS

DE    2 248 441    10/1972

(Continued)

OTHER PUBLICATIONS

The advertisment by Pyramid Industries, Inc regarding the Toneable Duct product (Publication date unkown but prior to Aug. 7, 2001).*

(Continued)

*Primary Examiner*—Angel R. Estrada
(74) *Attorney, Agent, or Firm*—Muncy, Geissler, Olds & Lowe, PLLC

(57) ABSTRACT

The present invention is a toneable conduit that can transmit a signal and that can therefore be readily detected by toning equipment. In addition, the conduit of the invention can be readily coupled with other conduit to provide extended lengths of conduit. The toneable conduit includes an elongate polymeric tube having a wall with an interior surface, an exterior surface, and a predetermined wall thickness. A channel extends longitudinally within the wall of the elongate polymeric tube and a stabilizing rib extends longitudinally along the interior surface of the wall of the elongate polymeric tube and is located radially inward from the channel. A continuous, coated, high elongation wire is coincident with the channel in the elongate polymeric tube and is coated with a coating composition that prevents the wire from adhering to the polymer melt used to form the elongate polymeric tube. The present invention further includes methods of making the toneable conduit and methods of coupling a first toneable conduit with a second toneable conduit.

48 Claims, 5 Drawing Sheets

U.S. PATENT DOCUMENTS

| | | | |
|---|---|---|---|
| 3,555,170 A | 1/1971 | Petzetakis | |
| 3,580,983 A | 5/1971 | Jackson | |
| 3,748,371 A | 7/1973 | Krook et al. | |
| 4,109,941 A * | 8/1978 | Wood et al. | 285/111 |
| 4,817,673 A | 4/1989 | Zoghby et al. | |
| 5,006,806 A | 4/1991 | Rippingale et al. | |
| 5,017,873 A | 5/1991 | Rippingale et al. | |
| 5,045,368 A | 9/1991 | Cosman et al. | |
| 5,051,034 A | 9/1991 | Goodman | |
| 5,061,823 A | 10/1991 | Carroll | |
| 5,114,517 A | 5/1992 | Rippingale et al. | |
| 5,212,349 A * | 5/1993 | Pelzer | 174/98 |
| 5,227,103 A * | 7/1993 | Muschiatti | 264/45.9 |
| 5,243,128 A | 9/1993 | Marcoz | |
| RE34,701 E | 8/1994 | Goodman | |
| 5,415,242 A * | 5/1995 | Pelzer | 174/21 R |
| 5,532,598 A | 7/1996 | Clark, Jr. et al. | |
| 5,812,358 A * | 9/1998 | Kawai et al. | 361/215 |
| 5,998,081 A | 12/1999 | Morrison | |
| 6,005,191 A * | 12/1999 | Tzeng et al. | 174/102 R |
| 6,053,457 A | 4/2000 | Ozga | |
| 6,068,426 A * | 5/2000 | Blanquet et al. | 405/184 |
| 6,092,558 A | 7/2000 | Maccario | |
| 6,105,649 A * | 8/2000 | Levingston et al. | 156/425 |
| 6,131,265 A * | 10/2000 | Bird | 29/507 |
| 6,135,159 A * | 10/2000 | Karl | 138/139 |
| 6,139,068 A * | 10/2000 | Burress et al. | 285/92 |
| 6,139,957 A * | 10/2000 | Craton | 428/379 |
| 6,933,438 B1 * | 8/2005 | Watts et al. | 174/480 |

FOREIGN PATENT DOCUMENTS

| | | | |
|---|---|---|---|
| DE | 2248441 | | 4/1974 |
| EP | 159307 | A1 | 10/1985 |
| EP | 0449795 | | 10/1991 |
| GB | 2 197 419 | | 5/1988 |
| JP | 03270787 | | 4/1993 |
| JP | 03270788 | | 4/1993 |
| JP | 03270789 | | 4/1993 |
| JP | 05106779 | A * | 4/1993 |
| RU | 2246068 | | 4/2000 |
| WO | WO 9615894 | | 5/1996 |

OTHER PUBLICATIONS

Article from www.duraline.com regarding the Tracer Duct product dated Aug. 8, 2001.

Advertisement by Pyramid Industries, Inc. regarding the Toneable Duct product. Publication date unknown but prior to Aug. 7, 2001.

International Search Report from corresponding International Application No. PCT/US02/37417 dated Mar. 21, 2003.

* cited by examiner

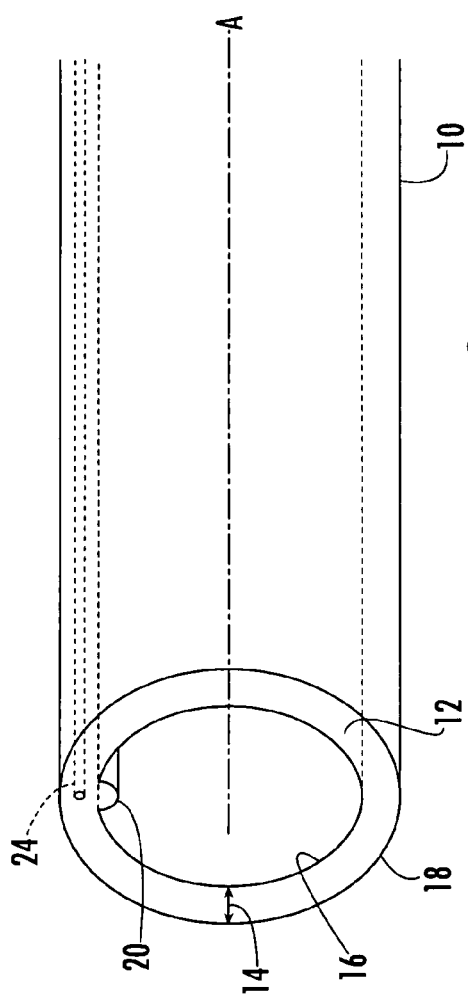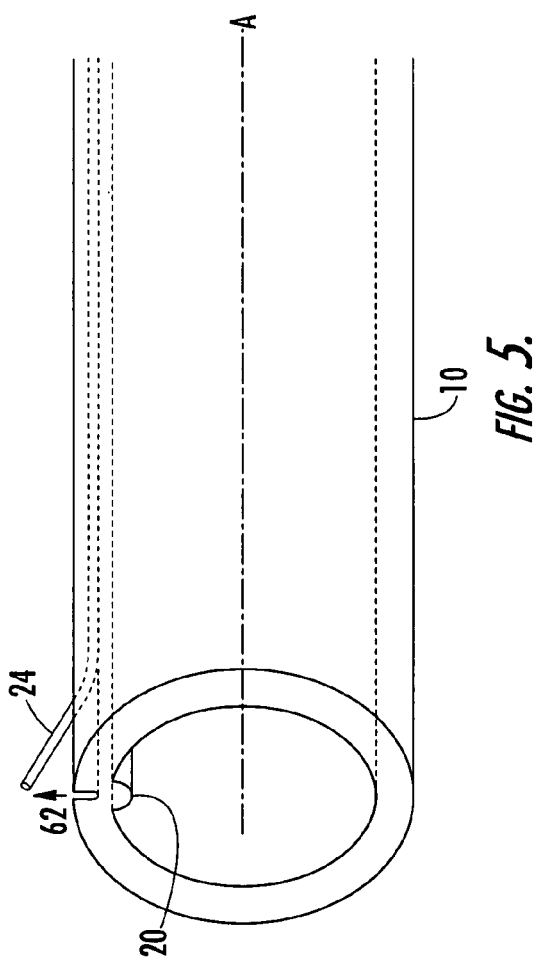

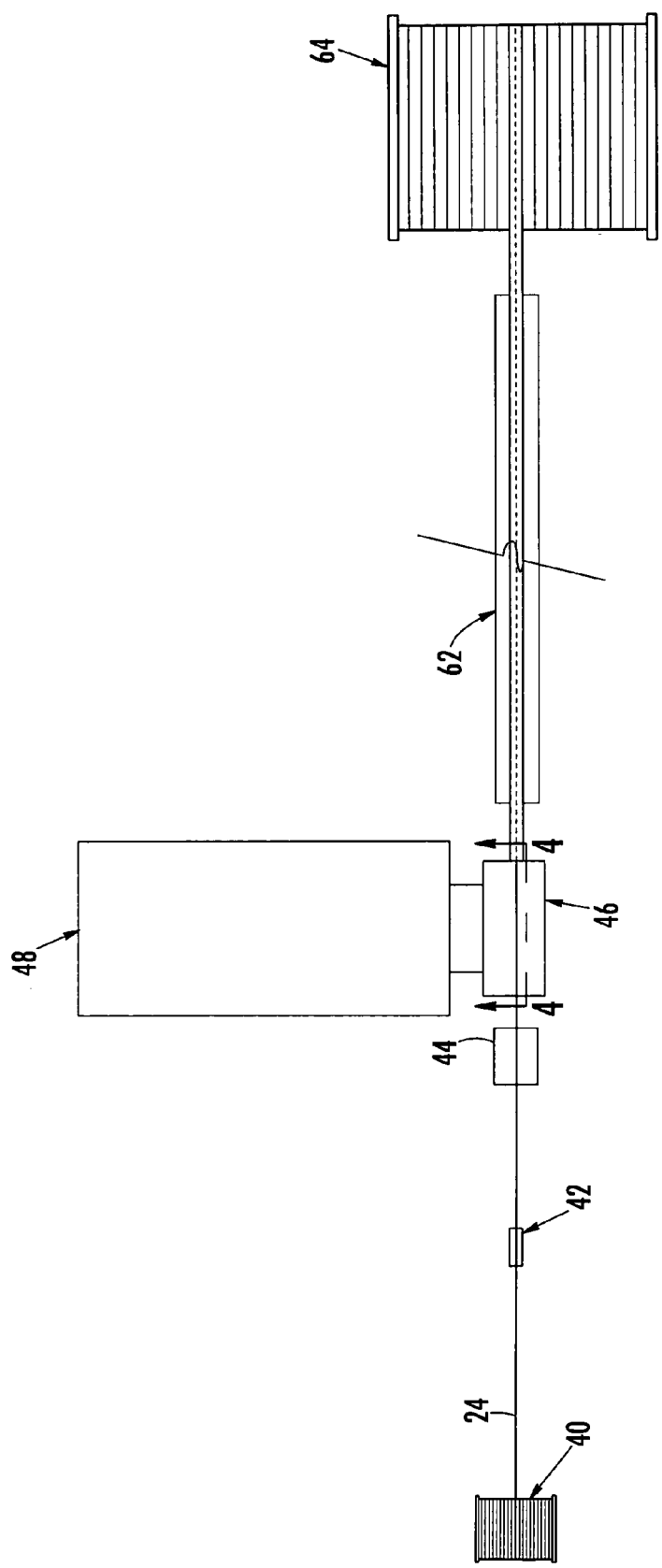

TONEABLE CONDUIT AND METHOD OF PREPARING SAME

FIELD OF THE INVENTION

The present invention relates to toneable conduit and more particularly to toneable conduit that can be detected by conventional toning equipment and that includes a high elongation wire that is capable of being torn out of the conduit to allow the conduit and wire to be coupled.

BACKGROUND OF THE INVENTION

Conduit is often buried to provide an underground path for cables such as coaxial cables and fiber optic cables. In particular, conduit is typically formed of a plastic material that protects the coaxial cables and fiber optic cables from the moisture and other hazards of the underground environment. The cable is typically installed in the conduit by pulling the cable through the conduit although the cable can be provided in the conduit when it is installed underground.

One issue with conduit is that it can be difficult to locate underground when it is either empty or it contains a non-metallic cable, such as a fiber optic cable. As a result, conduit has often been outfitted with a metallic or magnetic strip or wire that allows the conduit to be detected by metal detecting equipment on the ground surface. Although these types of detection devices are useful, they cannot always locate conduit that is buried deep underground (e.g. greater than 5 feet). As an alternative to these types of detection devices, toning equipment is commonly used that operates by transmitting a signal along a metallic wire or strip associated with the conduit and detecting the signal from the ground surface.

One conventional conduit construction that can be detected by conventional metal detection devices and even the toning devices discussed above includes an exterior rib that houses the metallic ribbon or wire. For example, Japanese published application JP 5-106765 describes an embodiment that includes an exterior rib including a conductive wire. Although these types of constructions have found use, it is difficult to couple this conduit with another conduit because the exterior rib prevents the connector from fitting flush onto the conduit. As a result, moisture can enter the conduit at the connection and can cause damage to the cable installed therein. In addition, the exterior rib can cause problems during installation in that the exterior rib and associated wire can be ripped off of the conduit if the conduit is being installed by directional boring or plowing methods.

Another conduit construction that is designed to be detected by metal detection devices includes a metallic ribbon or wire that is provided at intermittent lengths. For example, U.S. Pat. No. 6,092,558 describes such an embodiment wherein discrete lengths of a magnetic strip are spaced apart longitudinally along the conduit. U.S. Pat. No. 5,045,368 also describes a similar construction having markers at intervals along the length of the conduit. Although this type of conduit can be detected by the metal detection devices discussed above, it cannot be detected by conventional toning equipment because a signal cannot be transmitted along the conduit.

Alternatively, some conduit constructions use continuous lengths of strip or ribbon formed of metal or a magnetic material to allow the conduit to be detected by metal detecting equipment. For example, U.S. Pat. Nos. 5,051,034 and RE 34,701 describe this type of construction and use a ribbon of magnetic material to allow the conduit to be detected at three to five feet underground. U.S. Pat. Nos. 5,006,086; 5,017,873; and 5,114,517 use a magnetic ribbon that is spirally wound around the exterior surface of the conduit. Although the strip or ribbon in these constructions can be detected by conventional metal detecting equipment, it does not have a suitable construction for transmitting a toning signal for extended distances and at the depths desired in the art.

As demonstrated above, there is a need in the art to provide a conduit that can be detected by toning equipment for extended distances and at the depths desired in the art. In addition, there is a need in the art to provide conduit that can be coupled to provide extended lengths of underground conduit that can be detected by toning equipment.

SUMMARY OF THE INVENTION

The present invention provides a conduit that can transmit a signal over great distances and that can therefore be readily detected by toning equipment. In addition, the conduit of the invention can be readily coupled to provide extended lengths of conduit. In particular, the present invention uses a continuous wire to provide the toning signal and the wire has sufficient elongation to be torn out through the conduit to allow the conduit to be coupled over extended lengths by forming an electrical connection between the wire of adjacent segments of conduit. In addition, the connectors used for the conduit can be connected flush against the exterior surface of the conduit to prevent the leakage of moisture into the conduit and thus prevent damage to the cable within the conduit. The conduit of the invention also has excellent crush strength as is desired in the art. The conductive wire also includes a coating that allows the conductive wire to be protected in the underground environment and that facilitates the continuous production of the conduit of the invention.

The above advantages are achieved through the use of a toneable conduit that includes an elongate polymeric tube having a wall with an interior surface, an exterior surface, and a predetermined wall thickness. A channel extends longitudinally within the wall of the elongate polymeric tube and a stabilizing rib extends longitudinally along the interior surface of the wall of the elongate polymeric tube and is located radially inward from the channel. A continuous, high elongation wire is coincident with the channel in the elongate polymeric tube and is coated with a coating composition that prevents the wire from adhering to the polymer melt used to form the elongate polymeric tube. Preferably, the wire has an elongation of greater than about 1% and is preferably a copper-clad steel wire, copper-clad aluminum wire, copper wire or tin copper wire. More preferably, the wire is copper-clad steel wire. The wire also preferably has a diameter from about 0.32 mm to about 2.59 mm. More preferably, the wire has a diameter of 1.02 mm. In accordance with the invention, the wire is capable of transmitting a toning signal to allow the conduit to be detected by toning equipment and is capable of being torn out of the polymeric tube to allow the conduit to be coupled. The wire is preferably coated with a coating composition that is formed of a high melting temperature polymeric material, preferably having a melting temperature of at least about 500° F. Preferably, the high melting temperature polymeric material is selected from the group consisting of fluoropolymers, polyamides, polyesters, polycarbonates, polypropylene, polyurethanes, polyacetals, polyacrylics, epoxies and silicone polymers and is more preferably polytetrafluoroethylene. Preferably, the conduit is formed of polyethylene or polyvinyl chloride and more preferably high-density polyethylene (HDPE). The conduit also preferably has a smooth exterior surface and can further include at least one additional rib extending longitudinally along the interior surface of the elongate polymeric tube to facilitate the installation of cable within the conduit.

The present invention further includes a method of making toneable conduit, comprising the steps of advancing a high elongation wire and extruding a polymer melt around the advancing wire in the form of an elongate polymeric tube having a wall of a predetermined thickness, an interior surface, an exterior surface, and a stabilizing rib extending longitudinally along the interior surface of the wall of the elongate polymeric tube such that the wire is embedded in the wall of the elongate polymeric tube and the stabilizing rib is located radially inward from the wire. In accordance with the invention, the advancing step comprises advancing a wire coated with a coating composition that prevents the wire from adhering to the polymer melt used in said extruding step. Preferably, the polymer melt extruded into the form of an elongate polymeric tube through the use of a die and a tip, wherein a groove in said tip forms the stabilizing rib on the interior surface of the conduit. In addition, the wire is preferably advanced through a wire guide tube into the polymer melt. The method of the invention can also include forming additional ribs extending longitudinally along the interior surface of the elongate polymeric tube in the extruding step to facilitate the installation of cable into the conduit. The high elongation wire that is advanced into the polymer melt preferably has an elongation of at least about 1%. In particular, the wire is preferably a copper-clad steel wire, copper-clad aluminum wire, copper wire or tin copper wire and is more preferably copper-clad steel wire, and preferably has a diameter of from about 0.32 mm to about 2.59 mm. The wire is also preferably coated with a coating composition formed of a polymeric material selected from the group consisting of fluoropolymers, polyamides, polyesters, polycarbonates, polypropylene, polyurethanes, polyacetals, polyacrylics, epoxies and silicone polymers. Preferably, the polymeric material has a melting temperature of at least about 500° F., and is more preferably polytetrafluoroethylene. The polymer melt in said extruding step is preferably formed of a polymeric material selected from the group consisting of polyethylene and polyvinyl chloride, and is more preferably high density polyethylene. The polymer melt is preferably extruded in the form of an elongate polymeric tube having a smooth exterior surface.

The present invention also includes a method of coupling a first toneable conduit with a second toneable conduit, comprising the steps of providing a first toneable conduit as discussed above and providing a second toneable conduit as discussed above, tearing the wire of the first toneable conduit through the exterior surface of the first toneable conduit, tearing the wire of the second toneable conduit through the exterior surface of the second toneable conduit, mechanically connecting the first and second toneable conduits, and electrically connecting the wire from the first toneable conduit and the wire from the second toneable conduit.

These and other features and advantages of the present invention will become more readily apparent to those skilled in the art upon consideration of the following detailed description and accompanying drawings, which describe both the preferred and alternative embodiments of the present invention.

BRIEF DESCRIPTION OF THE DRAWINGS

FIG. 2 is a side view of the toneable conduit according to the present invention.

FIG. 3 schematically illustrates a method of making toneable conduit corresponding to a preferred embodiment of the invention.

FIG. 5 is a side view of the toneable conduit according to the present invention wherein the wire has been torn through the exterior surface of the conduit.

DETAILED DESCRIPTION OF THE PREFERRED EMBODIMENTS

Figure 1:
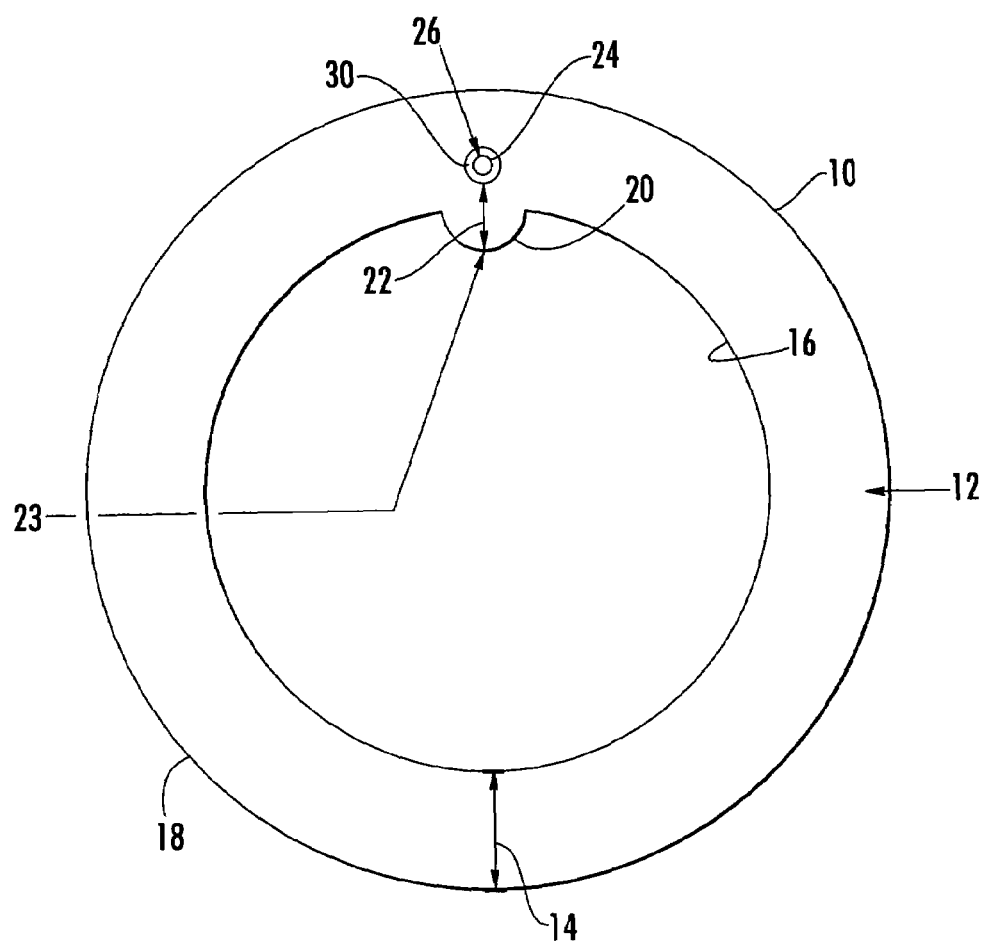
FIG. 1 is a cross-sectional view of the toneable conduit according to the present invention.

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings. In the drawings, like numbers refer to like elements throughout.

FIGS. 1 and 2 illustrate toneable conduit according to the present invention. As shown in these figures, the conduit is formed of an elongate polymeric tube 10 that includes a wall 12 having a predetermined thickness 14 and further includes an interior surface 16 and an exterior surface 18. The exterior surface 18 is preferably smooth so that the conduit can be effectively coupled as discussed in more detail below. The conduit can be formed of any suitable polymeric (i.e. plastic) material and suitable polymeric materials for conduit are known in the art such as polyethylene or polyvinyl chloride. Preferably, the elongate polymeric tube 10 is formed of high density polyethylene (HDPE). The wall 12 of the elongate polymeric tube 10 typically has a predetermined thickness 14 of from about 0.05 inches to about 0.75 inches. Moreover, the elongate polymer tube 10 typically has a diameter of from about 0.5 inches to about 6.5 inches.

The toneable conduit includes a stabilizing rib 20 that extends longitudinally along the interior surface 16 of the elongate polymeric tube 10. As shown in FIGS. 1 and 2, the stabilizing rib 20 is integral with the elongate polymeric tube 10 and formed of the same material as the elongate polymeric tube. The stabilizing rib 20 maintains the wall thickness 14 of the conduit when the wire is torn out of the conduit as discussed in more detail below such that it can withstand the forces typically associated with installation, use and transport of the conduit. Typically, the stabilizing rib 20 extends from the interior surface 16 of the elongate polymeric tube 10 such that the distance 22 from the wire to the interior edge 23 of the stabilizing rib is at least equal to the wall thickness 14. The stabilizing rib 20 is also located radially inward from the wire used in the invention. The stabilizing rib 20 illustrated in FIGS. 1 and 2 has a generally semicylindrical shape (i.e. an arcuate cross-section) but can have a rectangular or trapezoidal shape, for example, so long as it provides the desired amount of strength and stability to the conduit wall 12. In addition to the stabilizing rib 20, the conduit can include additional ribs (not shown) extending longitudinally along the interior surface 16 of the elongate polymeric tube 10 and integral with the elongate polymeric tube to facilitate the installation of cable in the conduit by decreasing the surface area in contact between the interior surface of the elongate polymeric tube and the cable.

As shown in FIGS. 1 and 2, the toneable conduit includes a high elongation wire 24 that extends longitudinally along the length of the elongate polymeric tube 10 and is coincident with a channel the extends longitudinally within the wall 12 of the elongate polymeric tube 10. The wire 24 runs continuously along the length of the elongate polymeric tube 10 and is embedded within the wall 12 of the elongate polymeric tube. In particular, the wire 24 is typically provided completely within the wall 12 of the elongate polymeric tube 10. Preferably, the wire 24 extends parallel to a central longitudinal axis A of the elongate polymeric tube 10.

The wire 24 possesses sufficient elongation to allow the wire to be torn out through the exterior surface 18 of the elongate polymeric tube 10. The wire 24 used in the invention preferably has an elongation of at least about 1% and more preferably at least about 3% as measured according to ASTM methods B3 and B869. The wire 24 is preferably a copper-clad steel wire, copper-clad aluminum wire, copper wire or tin copper (tin-clad copper) wire. More preferably, the wire 24 is a copper-clad steel wire. The wire 24 preferably has a diameter of from 0.32 mm (28 gauge) to 2.59 mm (10 gauge), and more preferably is a copper-clad steel wire having a diameter of 1.02 mm (18 gauge).

As mentioned above, the wire 24 runs continuously along the length of the elongate polymeric tube 10 and thus it can transmit a toning signal along the length of the conduit to allow the underground conduit to be detected from the surface by toning equipment. Moreover, because of the "skin effect" associated with signal transmission as understood by those skilled in the art, the signal is transmitted along the outer surface 26 of wire 24 and thus takes advantage of the conductivity of the copper portion present in the preferred wires used with the invention. As a result, the wire 24 of the conduit can transmit signals over long distances as desired in the art (e.g. at least 5 miles). It has been discovered that a larger diameter wire 24 (e.g. 18 gauge) transmits a toning signal over longer distances than a smaller diameter wire. Moreover, a larger diameter wire 24 is stronger than a smaller diameter wire and thus can more effectively be torn out of the conduit when it is coupled with other conduit.

The wire 24 is coated with a layer 30 of a coating composition. The coating composition layer 30 typically has a thickness of from about 1 to about 15 mils, and is more preferably about 8 mils. The coating composition layer 30 is formed of a material that prevents the wire 24 from adhering to the polymer melt used to form the elongate polymeric tube 10. Accordingly, the coating composition layer 30 is typically formed of a polymeric material that has a melting temperature above the temperature of the polymer melt so that is does not melt during the formation of the elongate polymeric tube 10. Preferably, the coating composition layer 30 is formed of fluoropolymers (e.g. polytetrafluoroethylene (PTFE), fluorinated ethylene-propylene (FEP), ethylenetrifluoroethylene (ETFE), and ethylenechlorotrifluoroethylene (ECTFE), polyvinyl fluoride (PVF) and polyvinylidene fluoride (PVDF)); polyamides (e.g. nylon); polyesters (e.g. polyethylene terephthalate (PET)); polycarbonates; polypropylene; polyurethanes; polyacetals; polyacrylics; epoxies; silicone polymers; and mixtures thereof. The high melting temperature polymeric materials used in the coating preferably has a melting temperature of at least about 500° F. More preferably, the coating composition layer 30 is formed of a fluoropolymer and is more preferably polytetrafluoroethylene (TEFLON®). Advantageously, because the wire 24 is coated with polytetrafluoroethylene, it also protects the wire 24 from the underground environment when it is torn out of the conduit and electrically connected to the wire from an adjacent conduit as discussed in more detail below. In particular, the coating composition layer 30 preferably provides corrosion resistance to the wire 24.

Although not illustrated in FIGS. 1 and 2, the conduit of the invention can include one or more cables such as coaxial cables, fiber optic cables, twisted pair cables, electrical cables, support or messenger cables, and the like. The advantages of the invention are particularly evident when toning equipment is used to locate empty conduit (not including any cable) or conduit containing non-metallic cable such as fiber optic cable as metallic cable can be detected underground without the need to use the conduit of the invention. Nevertheless, the conduit of the invention can be used to house metallic cable such as coaxial cable.

FIG. 3 illustrates the preferred method embodiment for producing the conduit of the invention. As shown in FIG. 3, the wire 24 is taken from a supply reel 40 and is fed through a wire guide 42. The wire 24 then passes through a lubrication apparatus 44 that lubricates the copper-clad steel wire for further downstream processing. The lubricated wire 24 then advances into a crosshead 46, which communicates with an extruder apparatus 48 via a flow channel (not shown). The polymeric materials and any additives such as colorants that are used to form the elongate polymeric tube 10 (and stabilizing rib 20) are fed to the extruder apparatus 48, e.g., through a hopper (not shown). In the preferred embodiment of the invention, the polymeric materials include HDPE as discussed above. The extruder apparatus 48 operates at an elevated temperature above the melting temperature of the polymeric materials used to form the elongate polymeric tube 10 to provide a polymer melt. For example, in the preferred embodiment of the invention wherein the conduit is formed of HDPE, the extruder apparatus 48 is operated at a temperature of from about 300° F. to about 500° F.

Figure 4:
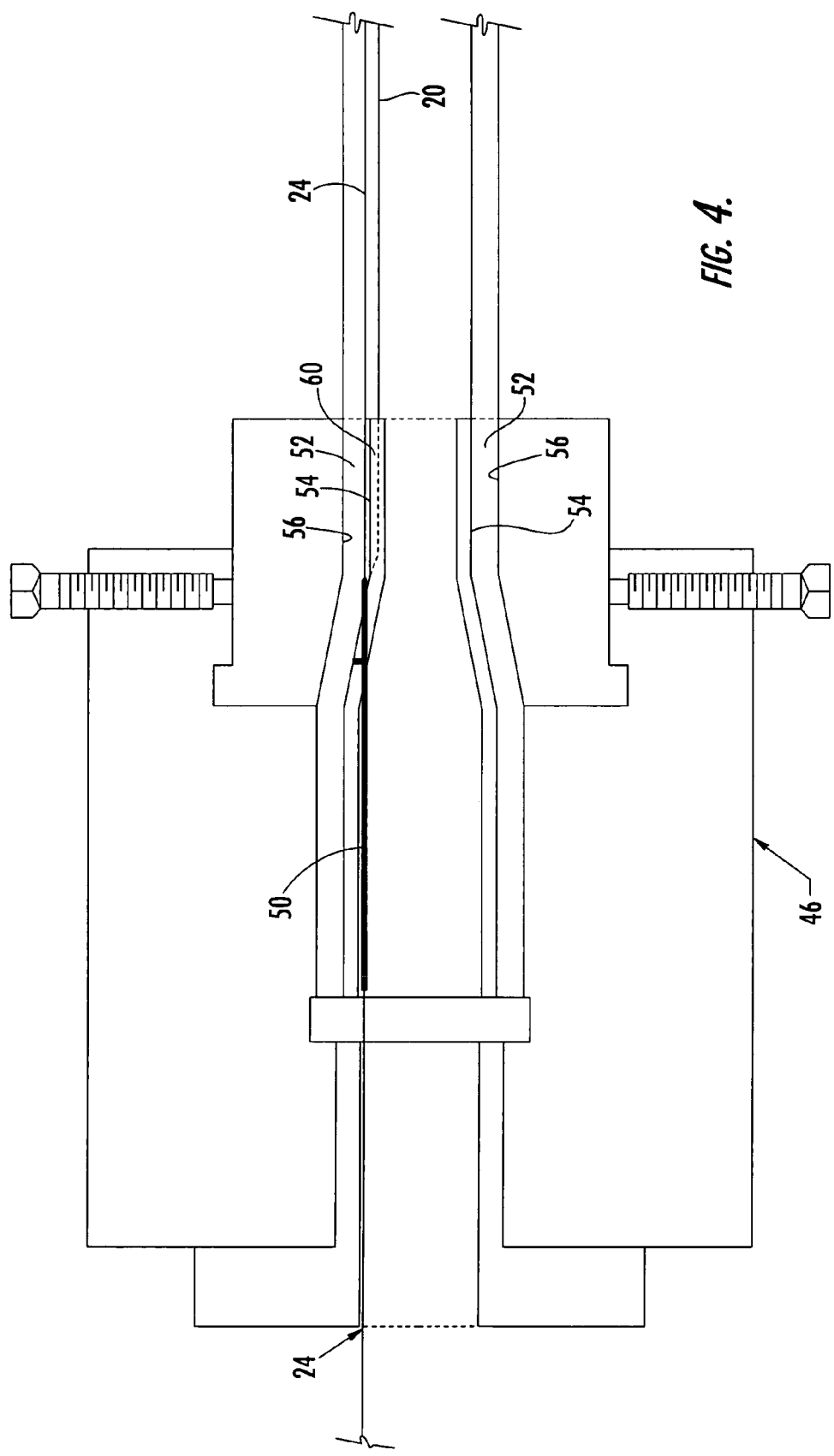
FIG. 4 is a cross-sectional view along line 4-4 of FIG. 3 illustrating the interior of the crosshead used to form the conduit according to the preferred embodiment of the invention.

FIG. 4 illustrates the formation of the conduit of the invention in more detail. A wire guide tube 50 delivers the wire 24 to an annular gap 52 between a tip 54 and a die 56 of the crosshead 46 while the extruder apparatus 48 delivers the polymer melt to the annular gap through a flow channel (not shown). The tip 54 and the die 56 form the annular gap 52 and shape the polymer melt into a tubular configuration to form the elongate polymeric tube 10. In particular, the tip 54 provides the shape of the interior surface 16 of the elongate polymeric tube 10 while the die 56 provides the shape of the exterior surface 18 of the elongate polymeric tube. A groove 60 provided in the tip 54 forms the stabilizing rib 20 in the conduit. Although not shown, additional grooves can be provided in the tip 54 to provide additional ribs along the interior surface 16 of the elongate polymeric tube 10 to facilitate the installation of cable in the conduit. The polymer melt forms around the wire 24 and the wire becomes embedded in the wall 12 of the elongate polymeric tube 10. The coating composition layer 30 on the wire 24 and the lubricant applied to the wire advantageously prevent the wire 24 from sticking to the polymer melt and facilitate the formation of the conduit of the invention.

Referring again to FIG. 3, the conduit leaves the crosshead 46 and advances to a cooling trough 62 that utilizes water to cool the conduit to allow it to harden. The conduit is then advanced to a take-up reel 64. The conduit can be stored or shipped on the take-up reel 64 and can readily be installed by unwinding the conduit from the take-up reel.

As mentioned above, the conduit of the invention can be readily coupled with other conduit. In particular, as shown in FIG. 5, the wire 24 can be torn out through the exterior surface 18 of the elongate polymeric tube 10 by applying a force on the wire perpendicular to the axis A in a direction 62. As discussed above, the preferred wire 24 used in accordance with the invention has sufficient strength to tear through the HDPE conduit. Once the wire 24 is torn out through the conduit, the conduit can be coupled with an adjacent conduit.

Figure 6:
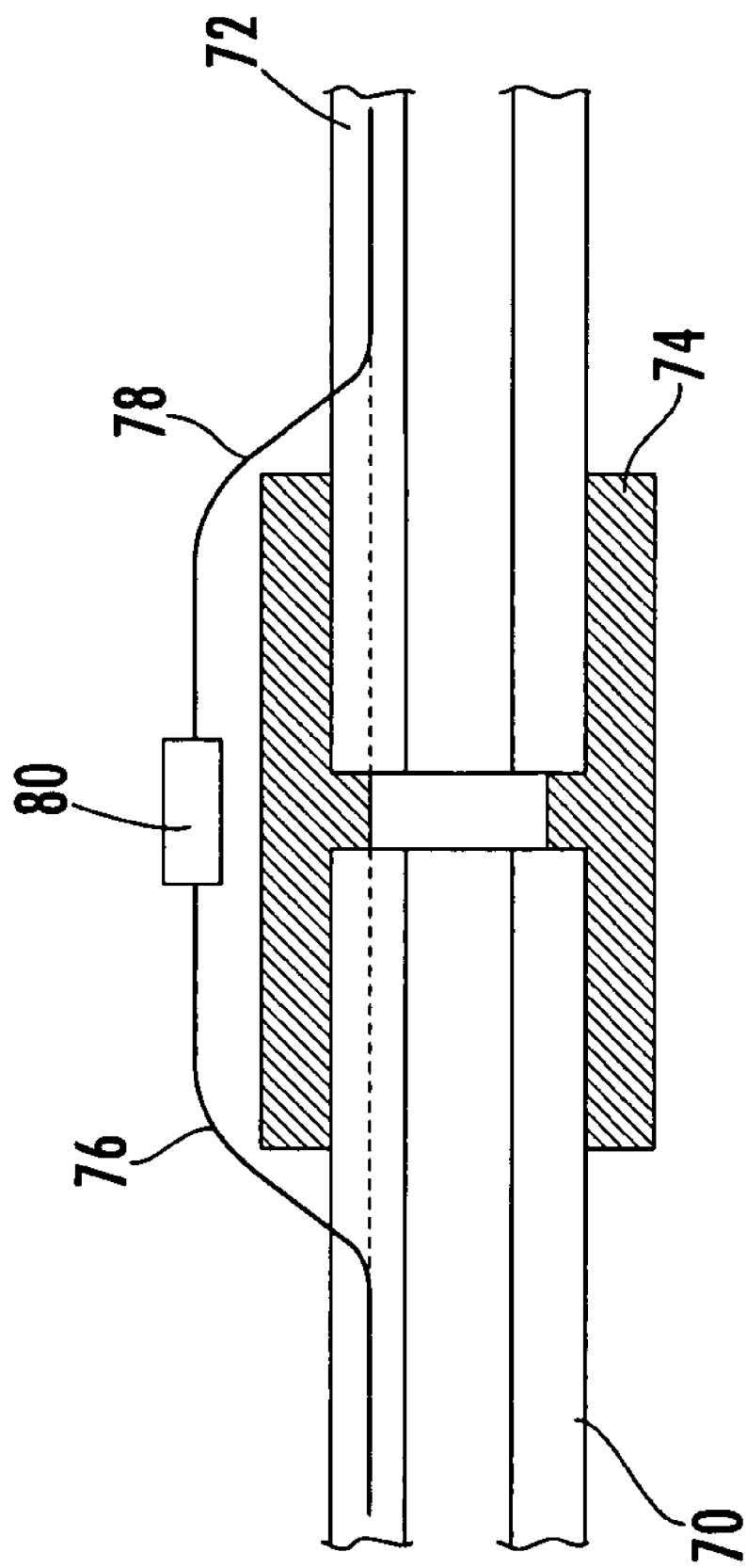
FIG. 6 is a side view of two adjacent coupled sections of conduit in accordance with the invention.

As shown in FIG. 6, a first conduit 70 is coupled with a second conduit 72. A conduit connector 74 is fitted onto the first conduit 70 and the second conduit 72 to provide a connection between adjacent segments of conduit. A wire 76 torn out of the first conduit 70 and a wire 78 torn out of the second conduit 72 are electrically connected or coupled together through the use of a suitable device such as the electrical connector 80. In accordance with the invention, because the conduit of the invention has a smooth exterior surface, the conduit connector 74 fits flush to the exterior surfaces of the first conduit 70 and second conduit 72. As is understood in the art, the first conduit 70, second conduit 72, conduit connector 74, wire 76, wire 78 and electrical connector 80 can optionally be wrapped by a shrink wrap film that is heated to allow it to shrink around the conduit to prevent the ingress of moisture into the conduit along the conduit connector 74.

The conduit of the invention can advantageously be detected with conventional toning equipment used in the art. In particular, when the conduit of the invention is buried underground, even if it is empty or contains a non-metallic cable, it can be detected by toning equipment by transmitting a signal along the wire 24 and detecting the signal from the ground surface. As a result, the conduit of the invention can be detected at levels at deep as 10 feet underground or even at greater depths through the use of toning equipment. Moreover, the conduit of the invention can also be detected by metal detecting equipment at the lower underground depths (e.g. 3-5 feet) where those types of devices are useful. In addition to being detectable by toning equipment, i.e., toneable, because the conduit of the invention can be readily coupled as discussed above, the conduit of the invention can be detected underground over extended lengths, e.g., 5 to 10 miles, as desired in the art.

It is understood that upon reading the above description of the present invention and reviewing the accompanying drawings, one skilled in the art could make changes and variations therefrom. These changes and variations are included in the spirit and scope of the following appended claims.

That which is claimed:

1. A toneable conduit, comprising:
   an elongate polymeric tube having a wall with an interior surface and an exterior surface, a channel extending longitudinally within the wall of the elongate polymeric tube; and
   a continuous wire coincident with the channel in the elongate polymeric tube and having sufficient strength to tear through the conduit;
   said wire capable of transmitting a toning signal to allow the conduit to be detected by toning equipment, wherein said wire is coated with a coating composition that prevents the wire from adhering to a polymer melt used to form the polymeric tube.

2. The toneable conduit according to claim 1, wherein the coating composition is formed of a polymeric material selected from the group consisting of fluoropolymers, polyamides, polyesters, polycarbonates, polypropylene, polyurethanes, polyacetals, polyacrylics, epoxies and silicone polymers.

3. The toneable conduit according to claim 1, wherein the coating composition is formed of a polymeric material that has a melting temperature of at least about 500° F.

4. The toneable conduit according to claim 1, wherein the coating composition is formed of polytetrafluoroethylene.

5. The toneable conduit according to claim 1, wherein the wire is selected from the group consisting of copper-clad steel wire, copper-clad aluminum wire, copper wire, and tin copper wire.

6. The toneable conduit according to claim 1, wherein the wire is copper-clad steel wire.

7. The toneable conduit according to claim 1, wherein the wire has a diameter of from about 0.32 mm to about 2.59 mm.

8. The toneable conduit according to claim 1, wherein said elongate tube has a predetermined wall thickness.

9. The toneable conduit according to claim 8, wherein the exterior surface of the tube is smooth.

10. The toneable conduit according to claim 1, wherein said elongate polymeric tube is formed of a polymeric material selected from the group consisting of polyethylene and polyvinyl chloride.

11. The toneable conduit according to claim 10, wherein said elongate polymeric tube is formed of high density polyethylene.

12. The toneable conduit according to claim 1, further comprising a stabilizing rib extending longitudinally along the interior surface of the wall of the elongate polymeric tube and located radially inward from and directly under said channel and at least one additional rib extending longitudinally along the interior surface of the elongate polymeric tube to facilitate the installation of cable within the conduit.

13. The toneable conduit according to claim 3, wherein the wire is selected from the group consisting of copper-clad steel wire, copper-clad aluminum wire, copper wire, and tin copper wire.

14. The toneable conduit according to claim 3, wherein the wire is copper-clad steel wire.

15. The toneable conduit according to claim 3, wherein the wire has a diameter of from about 0.32 mm to about 2.59 mm.

16. The toneable conduit according to claim 3, wherein the coating composition is formed of a polymeric material selected from the group consisting of fluoropolymers, polyamides, polyesters, polycarbonates, polypropylene, polyurethanes, polyacetals, polyacrylics, epoxies and silicone polymers.

17. The toneable conduit according to claim 3, wherein the coating composition is formed of polytetrafluoroethylene.

18. The toneable conduit according to claim 3, wherein said elongate tube has a predetermined wall thickness.

19. The toneable conduit according to claim 18, wherein the exterior surface of the tube is smooth.

20. The toneable conduit according to claim 3, wherein said elongate polymeric tube is formed of a polymeric material selected from the group consisting of polyethylene and polyvinyl chloride.

21. The toneable conduit according to claim 20, wherein said elongate polymeric tube is formed of high density polyethylene.

22. The toneable conduit according to claim 3, further comprising a stabilizing rib extending longitudinally along the interior surface of the wall of the elongate polymeric tube and located radially inward from and directly under said channel and at least one additional rib extending longitudinally along the interior surface of the elongate polymeric tube to facilitate the installation of cable within the conduit.

23. The toneable conduit according to claim 1, further comprising a stabilizing rib extending longitudinally along the interior surface of the wall of the elongate polymeric tube and located radially inward from and directly under said channel.

24. The toneable conduit according to claim 23, wherein the stabilizing rib is integral with the elongate polymeric tube.

25. The toneable conduit according to claim 2, wherein the wire is selected from the group consisting of copper-clad steel wire, copper-clad aluminum wire, copper wire, and tin copper wire.

26. The toneable conduit according to claim 2, wherein the wire is copper-clad steel wire.

27. The toneable conduit according to claim 2, wherein the wire has a diameter of from about 0.32 mm to about 2.59 mm.

28. The toneable conduit according to claim 2, wherein said elongate tube has a predetermined wall thickness.

29. The toneable conduit according to claim 28, wherein the exterior surface of the tube is smooth.

30. The toneable conduit according to claim 2, wherein said elongate polymeric tube is formed of a polymeric material selected from the group consisting of polyethylene and polyvinyl chloride.

31. The toneable conduit according to claim 30, wherein said elongate polymeric tube is formed of high density polyethylene.

32. The toneable conduit according to claim 2, further comprising a stabilizing rib extending longitudinally along the interior surface of the wall of the elongate polymeric tube and located radially inward from and directly under said channel.

33. The toneable conduit according to claim 32, further comprising at least one additional rib extending longitudinally along the interior surface of the elongate polymeric tube to facilitate the installation of cable within the conduit.

34. The toneable conduit according to claim 32, wherein the stabilizing rib is integral with the elongate polymeric tube.

35. The toneable conduit according to claim 4, wherein the wire is selected from the group consisting of copper-clad steel wire, copper-clad aluminum wire, copper wire, and tin copper wire.

36. The toneable conduit according to claim 4, wherein the wire is copper-clad steel wire.

37. The toneable conduit according to claim 4, wherein the wire has a diameter of from about 0.32 mm to about 2.59 mm.

38. The toneable conduit according to claim 4, wherein said elongate tube has a predetermined wall thickness.

39. The toneable conduit according to claim 38, wherein the exterior surface of the tube is smooth.

40. The toneable conduit according to claim 4, wherein said elongate polymeric tube is formed of a polymeric material selected from the group consisting of polyethylene and polyvinyl chloride.

41. The toneable conduit according to claim 40, wherein said elongate polymeric tube is formed of high density polyethylene.

42. The toneable conduit according to claim 4, further comprising a stabilizing rib extending longitudinally along the interior surface of the wall of the elongate polymeric tube and located radially inward from and directly under said channel.

43. The toneable conduit according to claim 42, further comprising at least one additional rib extending longitudinally along the interior surface of the elongate polymeric tube to facilitate the installation of cable within the conduit.

44. The toneable conduit according to claim 42, wherein the stabilizing rib is integral with the elongate polymeric tube.

45. A method of coupling a first toneable conduit with a second toneable conduit, comprising the steps of:
providing a first toneable conduit comprising an elongate polymeric tube having a wall with an interior surface and an exterior surface; a channel extending longitudinally within the wall of the elongate polymeric tube; and a continuous wire coincident with the channel in the elongate polymeric tube, wherein the wire is coated with a coating composition that prevents the wire from adhering to a polymer melt used to form the elongate polymeric tube;
providing a second toneable conduit comprising an elongate polymeric tube having a wall with an interior surface and an exterior surface; a channel extending longitudinally within the wall of the elongate polymeric tube; and a continuous wire coincident with the channel in the elongate polymeric tube, wherein the wire is coated with a coating composition that prevents the wire from adhering to a polymer melt used to form the elongate polymeric tube;
tearing the wire of the first toneable conduit through the exterior surface of the first toneable conduit;
tearing the wire of the second toneable conduit through the exterior surface of the second toneable conduit;
mechanically connecting the first conduit and second conduit; and
electrically connecting the wire from the first toneable conduit and the wire from the second toneable conduit.

46. The method according to claim 45, said providing steps comprising providing a first toneable conduit and a second toneable conduit wherein the wire in the first toneable conduit and in the second toneable conduit is a copper-clad steel wire.

47. The method according to claim 45, wherein the coating composition coating the wire in the first toneable conduit and in the second toneable conduit comprises polytetrafluoroethylene.

48. The method according to claim 45, said providing steps comprising providing a first toneable conduit and a second toneable conduit wherein the elongate polymeric tube of the first toneable conduit and the second toneable conduit is formed of high density polyethylene.

* * * * *